United States Patent [19]

Corrigan et al.

[11] Patent Number: 5,985,228
[45] Date of Patent: Nov. 16, 1999

[54] METHOD FOR CONTROLLING THE PARTICLE SIZE DISTRIBUTION IN THE PRODUCTION OF MULTICRYSTALLINE CUBIC BORON NITRIDE

[75] Inventors: Frank Raymond Corrigan, Franklin; Sam Anthony, Westerville; John Michael Zarichansky, Pataskala, all of Ohio

[73] Assignee: General Electric Company, Pittsfield, Mass.

[21] Appl. No.: 07/995,229

[22] Filed: Dec. 22, 1992

[51] Int. Cl.⁶ ................................................ C01B 21/64
[52] U.S. Cl. ................................. 423/290; 501/96.4
[58] Field of Search ...................... 423/290, 289, 423/384; 51/307; 501/96, 96.4

[56] References Cited

U.S. PATENT DOCUMENTS

| 2,947,617 | 8/1960 | Wentorf, Jr. | 51/307 |
|---|---|---|---|
| 4,289,503 | 9/1981 | Corrigan | 51/307 |
| 4,483,836 | 11/1984 | Adadurov et al. | 423/290 |
| 4,551,195 | 11/1985 | Iizuka et al. | 423/290 |

FOREIGN PATENT DOCUMENTS

| 0 022 177 | 1/1981 | European Pat. Off. | |
| 217608 | 12/1984 | Japan | 423/290 |

*Primary Examiner*—Steven P. Griffin
*Assistant Examiner*—Stuart Hendickson

[57] ABSTRACT

A method is provided wherein hexagonal boron nitride particulates are converted directly into cubic boron nitride particles or agglomerated masses which can be easily milled to the desired size due to the presence of an inert powder during the conversion to reduce interparticle bonding.

11 Claims, No Drawings

METHOD FOR CONTROLLING THE PARTICLE SIZE DISTRIBUTION IN THE PRODUCTION OF MULTICRYSTALLINE CUBIC BORON NITRIDE

BACKGROUND OF THE INVENTION

This invention relates to the cubic form of boron nitride and its formation or transformation from the hexagonal form of boron nitride. More particularly, this invention relates to the production of polycrystalline CBN abrasive particles of a controlled particle size from HBN powders.

Three crystalline forms of boron nitride are known: hexagonal boron nitride (HBN), a soft graphitic form similar in structure to graphite carbon; wurtzitic boron nitride (WBN), a hard hexagonal form similar to hexagonal diamond; and cubic boron nitride (CBN), a hard zinc blend form similar to cubic diamond. The three boron nitride crystal structures may be visualized as formed by the stacking of a series of sheets or layers of atoms. FIGS. 1-$a$ through 1-$c$ of U.S. Pat. No. 4,188,494 illustrate these structures in greater detail. In HBN crystals, the boron and nitride atoms bonded together are in the same plane as stacked layers. In the more dense CBN crystal structures, the atoms of the stacked layers are puckered out of plane. In addition, bonding between the atoms within the layers of an HBN crystal is predominantly of the strong covalent type, with only weak van der Waals bonding between layers. In CBN crystals, strong, predominantly covalent tetrahedral bonds are formed between each atom and its four neighbors.

Methods for converting HBN into CBN monocrystalline and polycrystalline particles are well known. U.S. Pat. No. 2,947,617 describes a method for preparing cubic boron nitride by subjecting a hexagonal form of boron nitride, in the presence of specific additive materials or catalysts, to very high pressures and temperatures within the cubic boron nitride stable region defined therein by the phase diagram of boron nitride in FIG. 1. Methods for the conversion of HBN to CBN in the absence of catalyst using higher pressures and temperatures are described in U.S. Pat. No. 3,212,852. See also Wakatsuki et al., "Synthesis of Polycrystalline Cubic Boron Nitride (VI)," and Ichimose et al., "Synthesis of Polycrystalline Cubic Boron Nitride (V) ," both in *Proceedings of the Fourth International Conference of High Pressure*, Kyoto, Japan, 1974, pp. 436–445; U.S. Pat. No. 4,016,244; JP SHO 49-27518 (Wakatsuki et al.); JP SHO 49-30357 (Wakatsuki et al.); JP SHO 49-22925 (Wakatsuki et al.); U.S. Pat. No. 3,852,078 (Wakatsuki et al.); Wakatsuki et al., "Synthesis of Polycrystalline Cubic Boron Nitride (V)," *Mat. Resp. Bul.* 7, 999–1004 (1972); and GB 1,317, 716 (Serota).

It is the cubic form of boron nitride which finds use as an abrasive material typically in the form of a cluster compact, a composite compact, or as particles agglomerated together to form an abrasive tool such as a grinding wheel. In cluster compacts and composite compacts, the abrasive crystals are chemically bonded together, typically in a self-bonded relationship. In contrast, the particles of an abrasive tool are physically bonded together with the aid of a matrix. U.S. Pat. Nos. 3,136,615 and 3,233,988 provide a detailed description of certain types of cluster compacts and methods for their manufacture. U.S. Pat. Nos. 3,743,489 and 3,767,371 provide a description of composite compacts and their manufacture.

Conventional methods for obtaining CBN particles for abrasive tools involve the conversion of fine-sized HBN powders to a CBN mass using the high pressure, high temperature methods described above. After formation, the large CBN mass is extensively milled to obtain particles which are of varying size. The particles are then sieved to obtain particles of a particular mesh size. Using this procedure results in the generation of a significant amount of particles too small for use, referred to as non-valued fines. Excessive milling of the CBN mass requires significant energy and also tends to round the particle edges, which reduces their performance in grinding applications.

It is desirable to provide a more efficient, cost-effective method for producing CBN particulates with reduced milling. U.S. Pat. No. 5,015,265 (Corrigan and Slutz) describes coating HBN particles with non-sinterable coatings prior to conversion of the HBN particles to CBN. This provides coated CBN particles of a desired size with reduced milling. It is desirable to reduce the milling necessary in providing uncoated CBN particles of a controlled size.

SUMMARY OF THE INVENTION

It is an object of this invention to provide a method for controlling the particle size distribution of multicrystalline CBN abrasive particles produced by conversion of HBN powders.

Another object is to reduce the energy required in milling a CBN mass to produce mesh-sized abrasive particles of multicrystalline CBN.

An additional object is to increase the yield of large mesh-sized multicrystalline CBN abrasive particles obtained upon milling the multicrystalline CBN abrasive mass.

A further object is to reduce the milling necessary in forming mesh-sized multicrystalline CBN abrasive particles.

Upon further study of the specification and claims, further objects and advantages of this invention will become apparent to those skilled in the art.

These and other objects are achieved by premixing the soft HBN source powder with a non-conversion interfering second phase prior to high pressure/high temperature conversion in an amount sufficient to reduce particle-to-particle fusion during the conversion process. Graphite provides a suitable second phase. This mixture is then exposed to simultaneous pressure and temperature conditions for a time sufficient to convert the HBN to CBN. Upon returning to ambient conditions, the second phase is removed, yielding easily milled or mesh-sized multicrystalline CBN particles.

In a preferred embodiment, the HBN source powder is densified or pre-pressed into an agglomerated mass or billet at low temperatures which is then granulated into agglomerated particles of a desired size. These agglomerated particles are then added to graphite and converted to CBN. Removal of the graphite provides CBN particles directly. In other embodiments, the particle size distribution of the CBN particles is controlled by adjusting the particle size distribution of the agglomerated HBN source powder.

DETAILED DESCRIPTION

A starting material for the practice of this invention is hexagonal boron nitride, preferably of ideal structure, also referred to as graphitic boron nitride (GBN). The HBN powder is preferably sized so as to control the particle size distribution of the resulting CBN particulate product. Currently available HBN powders having an average particle size of about 5–6 $\mu$m are suitable for use in this invention, as are smaller-sized powders (0.5 $\mu$m) and large-sized HBN particles of up to 600 $\mu$m, preferably 10–50 $\mu$m, which are described in copending application Ser. No. 07/735,503, filed Jul. 25, 1991, entitled "CUBIC BORON NITRIDE ABRASIVE AND PROCESS FOR PREPARING THE SAME." The HBN powders can be compressed into billet form and granulated to give particles of a size larger than those commercially available (5 to about 50 μm). In forming these billets, the HBN powder may be mixed with catalysts, conversion enhancers, or other additives used in the conversion process. Forming these larger agglomerated HBN particles provides for greater control over the resultant CBN particle size. Agglomerated particles ranging from 10–5000 μm in size are easily obtained. The HBN starting material is sieved to obtain the desired particle size prior to conversion. While there is great advantage in preselecting the particle size of the HBN starting material, it is to be recognized that HBN particles of any size or size distribution can be utilized in the present invention.

The HBN particles used in this invention may be subjected to conventional pretreatment steps such as those described in U.S. Pat. No. 4,289,503, where the powder is vacuum heated and fired to remove volatile impurities, particularly oxide contaminants (boron oxide). This vacuum firing is performed at the thermal decomposition temperature or a range of temperatures at which, in addition to degassing the surface oxide contaminants, a thin coating of free boron is generated from decomposition on the surfaces of the oxide-free powder particles.

When the HBN particles of a desired particle size are obtained, they are mixed with a material which is inert and does not interfere with the conversion of HBN to CBN so as to provide a second phase. An example of a suitable material is graphite. This mixture of HBN and inert material is then processed by conventional means to convert the HBN to CBN polycrystalline particles. The inert material is preferably in powder form. The amount and size of the powders is dependent on the desired size and separation of the polycrystalline CBN masses to be produced. The amount of inert powder used can range widely from less than 0.1 wt % to more than 99% of the mixture. While this broad range serves the objective of diluting the HBN powder to provide separation of the CBN crystals formed, a more efficient amount ranges from about 0.1% to about 15%, and amounts from about 0.5% to about 10% are more so. The efficient use of these inert powders is typically at levels which provide the desired CBN particle separation without the displacement of significant amounts of the HBN starting material used to form the CBN particulates.

In densifying or pre-pressing the HBN starting material to provide a billet or agglomerated mass, the HBN is compressed at low temperature, preferably at ambient temperature. The billet may also contain the catalyst desired for conversion in amounts up to 40 wt % and/or other additives such as CBN crystals in an amount of from about 1–50 wt % based on the total wt % of the billet. The billet is easily milled to large-sized particles or granules of a desired size in that strong bonds have not formed between the particulates therein.

These HBN particulates are converted to polycrystalline CBN under conventional high pressure, high temperature conditions with conventional equipment. The term "conversion" is employed generically to denote the change or changes which occur in the hexagonal form of boron nitrides to the cubic form of boron nitride. Conversion reactions which utilize a catalyst material and those which do not are included within this invention.

The conversion process may be carried out with any conventional high pressure/high temperature apparatus utilizing conventional pressures and temperatures. An apparatus of the type described in U.S. Pat. No. 2,941,248 is an example of a satisfactory press. The apparatus typically includes a pair of cemented tungsten carbide punches and an intermediate belt or die member of the same material in which a reaction vessel is positioned. The reaction vessel is typically is a hollow wall cylinder made of a material which is not converted to a stronger, stiffer state under operating conditions and has substantially no volume discontinuities. The volume of the reaction vessel is small in size. For example, the ratio of the distance between the punch faces to the diameter d of the face portion is less than about 2 and preferably below 1.75. The apparatus also includes heating means, typically a graphite electrical resistance heater, to provide the high temperatures necessary. Other apparatus with different components and configurations are capable of providing the required pressures and temperatures for conversion. A more detailed description of suitable equipment is found in U.S. Pat. No. 2,947,617.

The pressures and temperatures within the apparatus are adjusted to provide reaction conditions above the hexagonal boron nitride-cubic boron nitride equilibrium line on the phase diagram of boron nitride. Pressures of 20,000–100,000 atms are typical. It is difficult to measure the pressure and temperature to which the reactants are subjected by direct means because of the extreme pressures employed. Therefore, in measuring pressure, it is recognized that certain metals undergo distinct changes in electrical resistance at particular pressures. Thus, bismuth undergoes a phase change at 24,800 atms; thallium undergoes such a change at 43,500 atms; cesium, at 53,500 atms; and barium, at 77,400 atms. By determining the hydraulic pressure load necessary to cause a phase change in a metal such a bismuth, a point on the pressure-press load curve is determined. By carrying out the same operation with other metals, such as thallium, cesium, and barium, for which these phase change points are known, a series of points on a pressure-press load curve are obtained.

The melting point of germanium varies directly with the pressure over an extremely wide pressure range. The changes in melting point for germanium with pressure has been found to be in a straight line when the pressure is determined by the pressure-press curves described above. Therefore, by applying other press loads to a reaction vessel filled with germanium and determining the melting point of germanium, the actual pressure in the chamber at a given press load can be determined.

The temperature in the reaction vessel can be determined by conventional means such as by placing a thermal coupling juncture and measuring the temperatures of the juncture in the usual manner. Electrical energy at a predetermined rate is supplied to the apparatus, and the temperature produced by this power is measured by the thermocouple assembly. This same procedure is repeated a number of times with different power inputs to produce a calibration curve of power input versus temperature in the reaction vessel. After a calibration of the apparatus is obtained by this method, the temperature of the contents of the reaction vessel is determined by the power input to the apparatus in conjunction with calibration curve. In general, to produce a temperature of about 1800° C. in the apparatus described in U.S. Pat. No. 2,941,248, an alternating current voltage of about 1–3 volts at a current of about 200–600 amps is used to deliver the required 600–700 watts through the graphite heating tube.

The pressure/temperature curve of the boron nitride phase diagram indicates to a varying degree maximum temperature limits within which a cubic boron nitride-forming reaction may take place. While as a practical matter, economics would dictate the use of temperatures and pressures not too far above the indicated minimums, it is evident from the curve that there is an ample pressure and temperature range within which the best mode of carrying out the invention can be practiced.

After exposing the mixture of HBN and inert material to high pressure and high temperature sufficient to convert the HBN, the reaction mixture is returned to ambient conditions, and the conversion product is removed from the cell. The conversion product may be treated to remove the inert second phase to yield individual multicrystalline CBN particles, or, if insufficient inert material is used to isolate the individual particles, the conversion product may easily be milled to the desired size prior to second phase removal. Where the inert material is graphite powder, sulfuric/nitric acid mixtures are suitable for removing the graphite phase. Where small, mesh-sized, individual CBN particles are obtained from the reaction mixture, it may still be desirable to mill such particles to improve the shape to shift the particle size distribution. Significantly less milling of the CBN is required in comparison to the processing of conventionally made multicrystalline CBN masses. Certain milling steps, such as jaw crushing and possibly hammer milling, may be significantly reduced or eliminated.

In addition to reducing the milling necessary to size the CBN product, the process may increase the yield of large-sized particles which are saleable/usable from the high pressure, high temperature cycle. By controlling the particle size distribution of the HBN starting material, the generation of fines too small to be used as abrasives is reduced.

It is desirable to obtain milled CBN particles with an average particle size of from 10–5000 $\mu$m. Such particles are typically sieved to isolate particles of a desired size to provide tools with controlled breakdown characteristics. Typically, these particles are sieved to obtain sizes within the range of 75–3500 $\mu$m and most preferably from 100–2000 $\mu$m. Such particles are particularly suitable for use in abrasive tools comprised of agglomerated particulates such as grinding wheels. Depending on the starting material, yields of over 90% can be obtained of the large-sized particles (greater than 75 $\mu$m) which are saleable or usable. Yields of over 80% of these large-sized particles are common.

The CBN particles formed directly upon conversion have a distinct profile from those CBN crystals obtained by milling. The particles are not as rounded and provide the sharp surfaces needed in abrading or cutting tools. Despite these distinct features, the CBN abrasive particles produced by this invention have utility consistent with conventional CBN particulates and are widely applicable for industrial purposes in the same manner as conventional CBN particulates. The particulates can be coated with a protective metal or one used to aid bonding within a matrix. Conventional coating materials such as nickel, tungsten, etc. are suitable. However, when bound in a matrix to form abrasive tools in a manner consistent with conventional CBN particles, the polycrystalline CBN abrasive particles of this invention provide improved grinding performance over conventional tools.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth in degrees Celsius; and, unless otherwise indicated, all parts and percentages are by weight.

The entire disclosure of all applications, patents, and publications, cited herein, are hereby incorporated by reference.

EXAMPLES

Example 1

A quantity of fine-sized HBN powder was vacuum fired in the boron nitride thermal decomposition range, as described in U.S. Pat. No. 4,289,503 to obtain a source powder (5.7% weight loss) for conversion to polycrystalline CBN. The vacuum fired HBN powder was mixed with 20 wt % CBN crystals and isopressed to form a cylindrical billet. The billet was broken up and granulated to powder form. The powder was then sieved into mesh-sized fractions. Various mixtures of the 6/12, 12/20, 20/40, and 40/60 mesh-sized fractions with 0.5, 1, 2, 5, 10, and 30 wt % graphite powder additions (Union Carbide Grade SP-1 high purity graphite powder) were made. Samples of the various mixtures were loaded into high pressure cells and pressed at high pressure/high temperature to convert the agglomerated HBN particles to polycrystalline CBN consistent with the processes described in U.S. Pat. Nos. 2,947,617 and 4,188,194. The recovered converted samples were treated with sulfuric/nitric acid mixtures to remove the graphite.

Graphite additions in the 0.5–2 wt % range were found to cause break-up of the typical unitary slugs or large slug pieces into numerous smaller pieces. At 5 wt % greater graphite addition levels, the 6/12 and 12/20 mesh source HBN particles, individual polycrystalline CBN particles were obtained, and the particle size distribution of the polycrystalline CBN particles were found to be related to the source HBN powder size.

Example 2

Approximately 150 g batch of the 6/12 mesh source from Example 1 was mixed with 10 wt % graphite powder and pressed at high pressure/high temperature consistent with the procedures used in Example 1. The recovered converted polycrystalline CBN material was acid-cleaned to remove the graphite, yielding mesh-sized polycrystalline CBN particles. The batch was sized, giving the particle size distribution shown below in Table 1:

TABLE 1

| Mesh Size | Micron Size | Average Micron Size | Normalized* Size | Converted PSD (%) |
|---|---|---|---|---|
| 6/12 | 3360/1680 | 2250 | 1.00 | 22.0 |
| 12/20 | 1680/840 | 1260 | 0.50 | 42.8 |
| 20/40 | 840/420 | 630 | 0.25 | 18.3 |
| 40/80 | 420/177 | 299 | 0.12 | 10.4 |
| 80/170 | 177/88 | 133 | 0.05 | 3.8 |
| −170 | — | — | — | — |

*Ratio of average micron size/source powder average micron size.

The data in Table 1 demonstrates that the CBN particles have a particle size distribution that peaks at a size about one-half that of the source HBN powder size.

Example 3

As in Example 2, approximately 150 g of the 12/20 mesh source powder from Example 1 was mixed with about 10 wt % graphite and pressed under high pressure/high temperature conditions consistent with the procedures used in Example 1. The recovered converted CBN material was acid-cleaned, yielding individual mesh-sized particles of polycrystalline CBN. The particle size distribution for the resultant particles is given in Table 2 below:

TABLE 2

| Mesh Size | Micron Size | Average Micron Size | Normalized Size | Converted PSD (%) |
|---|---|---|---|---|
| 6/12 | 3360/1680 | 2250 | 2.00 | 0.2 |
| 12/20 | 1680/840 | 1260 | 1.00 | 32.8 |
| 20/40 | 840/420 | 630 | 0.50 | 41.1 |
| 40/80 | 420/171 | 299 | 0.25 | 16.7 |
| 80/170 | 177/88 | 133 | 0.12 | 5.2 |
| −170 | — | — | — | 4.1 |

The data in Table 2 demonstrates that the CBN particles have a particle size distribution that peaks at a size of about one-half that of the source HBN powder size.

Example 4

Approximately 835 g of 12/60 mesh source powder was mixed with 5 wt % graphite powder and pressed under high pressure/high temperature conditions consistent with the procedures used in Example 1. The polycrystalline CBN product was recovered from the reaction cell in the form of loose sintered masses, which were easier to break than conventional polycrystalline CBN slugs. Mild jaw crushing was sufficient to break the product into ¼-inch pieces. After one hammer mill pass, the material was uniformly granular, with 70% of the material remaining in the original 16/20 mesh size. Subsequent hammer milling passes resulted in low percentage breakdown, which indicates that the mesh-sized particles retained the desired toughness. Visually, all sizes were equivalent to conventional multicrystalline product with sharp edges.

Graphite treatment was also found to significantly reduce the milling necessary when compared to untreated source HBN powder. The graphite-treated HBN source also provided greater control over the particle size distribution with a yield in the target size that was 50% greater than conventional untreated batches.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A method for producing multicrystalline cubic boron nitride particles, comprising:

subjecting a mixture comprised of hexagonal boron nitride particles and an inert material to simultaneous temperature and pressure conditions in a reaction chamber for a time sufficient to convert the hexagonal boron nitride (HBN) to cubic boron nitride (CBN), said reaction chamber being the type using carbide punches and electrical resistance heating, wherein said inert material does not interfere with the conversion of HBN to CBN;

returning the mixture to ambient conditions;

removing the inert material from said mixture; and recovering cubic boron nitride masses from said mixture wherein at least 80 percent of said masses have a particle size greater than 75 $\mu$m and comprise sharp surfaces.

2. The process of claim 1, wherein the inert material is in powder form, and the cubic boron nitride masses recovered from said mixture are in the form of isolated particles.

3. The process of claim 2, wherein the cubic boron nitride particles recovered have a smaller average particle size than the hexagonal boron nitride within the mixture and a particle size distribution which conforms to the particle size distribution of the hexagonal boron nitride within the mixture.

4. The process of claim 1, wherein the cubic boron nitride masses recovered from the reaction mixture comprise CBN agglomerates, and said process comprises the additional step of milling these large CBN agglomerates to CBN particles of a smaller size.

5. The process of claim 1, wherein the amount of inert material is greater than 0.5 wt % of the mixture.

6. The process of claim 2, wherein the amount of inert powder is from 0.5 wt % to about 70 wt % of the mixture.

7. The process of claim 6, wherein the inert powder is graphite.

8. The process of claim 1, wherein the hexagonal boron nitride particles utilized in said reaction mixture are sieved to a desired size in the range of 10–5000 $\mu$m prior to conversion.

9. The process of claim 8, wherein the hexagonal boron nitride particles which are sieved are obtained by pre-pressing hexagonal boron nitride powder to form a billet and milling said billet to provide said hexagonal boron nitride particles.

10. The process of claim 2, wherein more than 80% of the isolated CBN particles obtained are of a size in the range of 10–5000 $\mu$m.

11. The process of claim 2, wherein more than 80% of the isolated CBN particles obtained are of a size in the range of from 75–3500 $\mu$m.

\* \* \* \* \*